(12) United States Patent
Amin et al.

(10) Patent No.: US 6,429,706 B1
(45) Date of Patent: Aug. 6, 2002

(54) VOLTAGE SEQUENCING CIRCUIT FOR POWERING-UP SENSITIVE ELECTRICAL COMPONENTS

(75) Inventors: Dilip A. Amin, San Jose; Chang Hong Wu, Cupertino; Ross Heitkamp, Mountain View; Michael Armstrong, Sunnyvale, all of CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/983,423

(22) Filed: Oct. 24, 2001

Related U.S. Application Data

(63) Continuation of application No. 09/729,239, filed on Dec. 5, 2000, now Pat. No. 6,333,650.

(51) Int. Cl.[7] ................................................. H03L 7/00
(52) U.S. Cl. ..................................................... 327/143
(58) Field of Search ................................. 327/142, 143, 327/198, 530, 534, 535, 537, 540, 545

(56) References Cited

U.S. PATENT DOCUMENTS

| | | | | |
|---|---|---|---|---|
| 5,437,040 A | * | 7/1995 | Campbell et al. ............. | 307/22 |
| 5,446,404 A | * | 8/1995 | Badyal et al. ............... | 327/143 |
| 5,613,130 A | * | 3/1997 | Teng et al. .................. | 710/302 |
| 5,811,991 A | * | 9/1998 | Takashima ................... | 326/28 |
| 5,936,443 A | * | 8/1999 | Yasuda et al. ............... | 327/143 |
| 6,237,103 B1 | * | 5/2001 | Lam et al. ................... | 713/300 |
| 6,243,067 B1 | * | 6/2001 | Noguchi et al. ............. | 345/102 |

* cited by examiner

*Primary Examiner*—Jeffrey Zweizig
(74) *Attorney, Agent, or Firm*—Harrity & Snyder, L.L.P.

(57) ABSTRACT

A voltage sequencing circuit powers-up electrical systems by sequentially enabling a series of power supply lines to the electrical system. After each power supply line is enabled, the voltage sequencing circuit waits a pre-programmed delay time before enabling the next power supply line. The delay time allows the newly enabled power supply line to settle. Additionally, the voltage sequencing circuit constantly monitors previously enabled power supply lines while continuing to enable the remaining power supply lines. If any of the previously enabled lines fail, the voltage sequencing circuit disables the power supply line before reinitiating a complete power-up sequence.

15 Claims, 3 Drawing Sheets

VOLTAGE SEQUENCING CIRCUIT FOR POWERING-UP SENSITIVE ELECTRICAL COMPONENTS

This application is a continuation of Application No. 09/729,239, filed Dec. 5, 2000, which issued as U.S. Pat. No. 6,333,650 on Dec. 25, 2001.

BACKGROUND OF THE INVENTION

A. Field of the Invention

The present invention relates generally to power systems and, more particularly, to the initial application of power to electrical systems.

B. Description of Related Art

In certain electrical systems, such as computer and communication systems, different parts of the system may be designed to be powered from different power sources. For example, a computer system may include a first component designed to operate with a 1.5 volt source, a second component designed to operate with a 3.3 volt source, and a third component designed to operate with a 10 volt source. Typically, such electrical systems provide the power to each component through a series of regulators that convert power from a main power supply to a power level appropriate for each component. Because each regulator draws from the same main power supply, the different voltages (or currents) supplied to the components are not fully independent of one another. That is, power fluctuations caused by one of the components can affect the power supplied to the other components. This effect can be exacerbated by the fact that the components may be further tied to one another through electrical connections at the signal level.

Due to this lack of isolation between the components of the electrical system, when initially powering-up each component, it is desirable to sequentially power up each component and wait until the power to the component stabilizes before supplying power to the next component. In this manner, large, potentially damaging power spikes can be avoided. This can be particularly important when dealing with sensitive electronic equipment.

Conventional sequential power-up circuits were either manually operated by a user or automated through a simple on/off architecture that delayed power to each component using a resistor/capacitor structure. Such circuits can be inadequate for highly sensitive components in modern electrical systems.

Thus, there is a need in the art to improve power-up sequencing when supplying varying power levels to multiple components in an electrical system.

SUMMARY OF THE INVENTION

Systems and methods consistent with the present invention address this need by providing a reliable power-up sequencing circuit that monitors and sequentially enables power to components in an electrical system.

In accordance with an aspect of the present invention as embodied and broadly described herein, a voltage sequencing circuit is described that includes multiple elements. These elements include electrical power sources configured to supply power to electrical components having differing power requirements. Additionally, a power monitor connects to the outputs of the electrical power sources to detect failures in the electrical power sources. A decision logic component connects to the electrical power sources and to an output of the power monitor. The decision logic performs a power-up sequence by sequentially enabling the electrical power sources and verifying, based on outputs from the power monitor, that an enabled one of the electrical power sources is stable before enabling a next one of the electrical power sources.

A method consistent with another aspect of the present invention provides power-up services to an electrical system from multiple different power sources. The method includes: (a) enabling a first of the power sources to source power to the electrical system; (b) waiting a predetermined period for the power from the first of the power sources to settle; and (c) beginning to monitor an output of the first of the power sources for a failure in the sourced power. Additionally, (a), (b) and (c) are repeated for each additional power source, and all of the power sources are disabled when any of the monitored power sources fail.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

As described herein, a voltage sequencer reliably powers-up electrical systems requiring multiple voltage levels. Control sequencing logic within the voltage sequencer monitors power sources at the output of a number of power regulators and determines when to enable each of the power regulators. The delay time between enabling power regulators can be individually set by the system designer.

Figure 1:
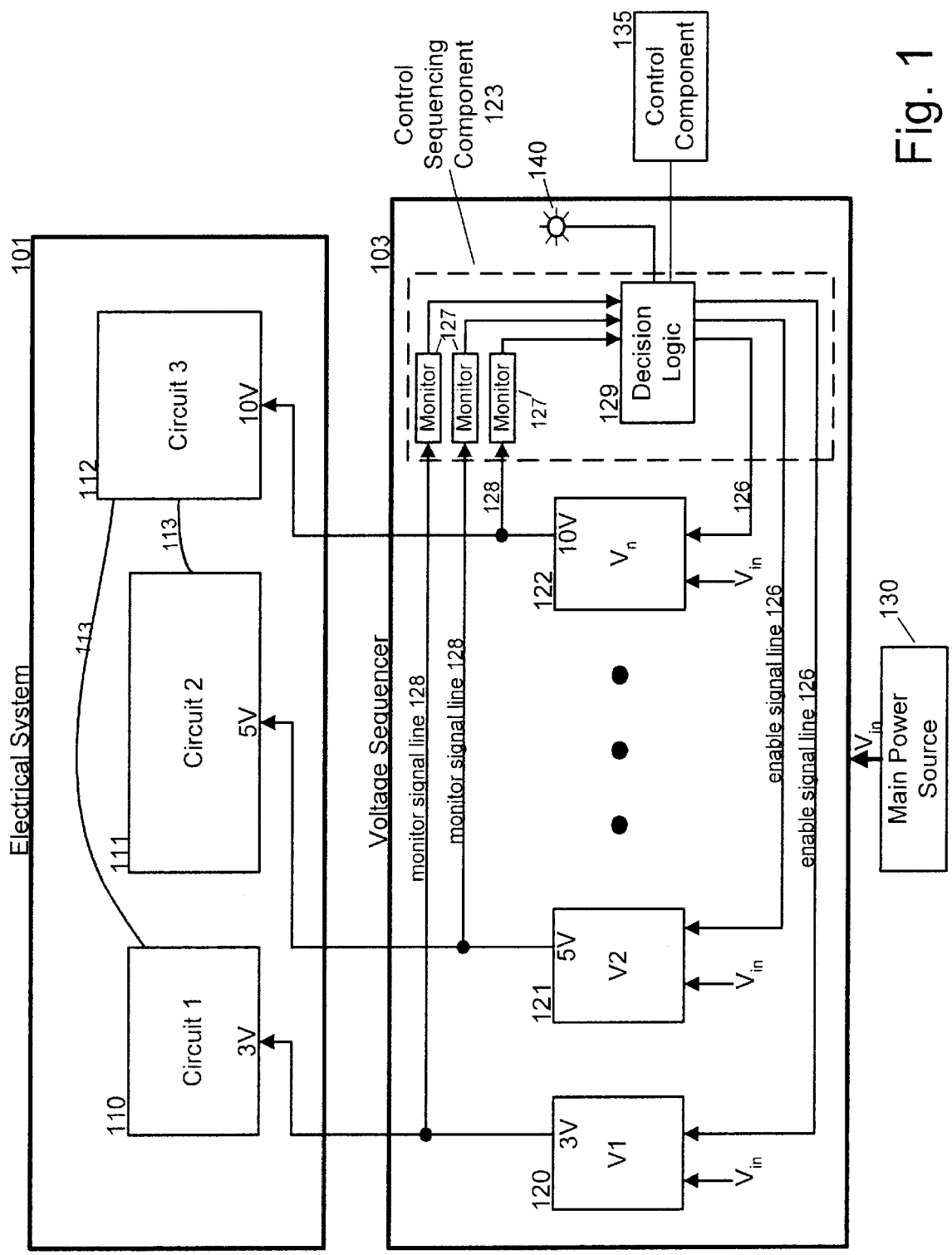
FIG. 1 is a block diagram of a system, including a voltage sequencing circuit consistent with an aspect of the present invention.

FIG. 1 is a block diagram of an electrical system 101 connected to a voltage sequencer 103 that provides power to electrical system 101. Electrical system 101 includes exemplary electrical components, labeled as circuit 110, circuit 111, and circuit 112. As illustrated by communication paths 113, circuits 110–112 may communicate with or otherwise be electrically coupled to one another.

Electrical system 101 may be any type of electronic device that requires a sequential power-up from multiple power levels. A high performance network switch or router is one possible example of an implementation of electrical system 101. Voltage sequencer 103 provides power to circuits 110–112 in electrical system 101, and generally includes power regulators 120–122 and control sequence component 123. Power regulator 120 provides power to circuit 110, power regulator 121 provides power to circuit 111, and power regulator 122 provides power to circuit 112. Each of power regulators 120–122 may receive their input power from a main power supply source 130. As illustrated, power regulator 120 converts power from power source 130 into a 3 volt DC output, power regulator 121 converts power from power source 130 into a 5 volt DC output, and power regulator 122 converts power from power source 130 into a 10 volt DC output.

Control sequencing component 123 monitors and controls regulators 120–122. In particular, control sequencing logic 123 includes monitor circuits 127, which are each connected to the output of one of regulators 120–122 through monitor signal lines 128. Each of monitor circuits 127 continuously monitors its input signal line 128 and signals decision logic 129 when the power on its line fails. A power failure may be triggered by, for example, a complete loss of the power, a power spike that exceeds a preset threshold, or an abnormal power drop off.

Decision logic 129 of control sequencing component 123 decides, based on signals from monitor circuits 127, whether to activate enable signal lines 126. When one of enable signal lines 126 is activated, the corresponding power regulator is "enabled," and will source power to electrical system 101. When the enable signal line 126 is not activated, the corresponding power regulator is disabled, and stops transmitting power to electrical system 101.

Voltage sequencer 103 may also include components that provide visual feedback to a user, such as light emitting diode (LED) 140. As shown, LED 140 is controlled by control sequencing component 123. Control sequencing component 123 may additionally provide electrical feedback to other system components, such as control component 135, as to the result of a power-up sequence. Control component 135 may also initiate a power-up sequence. Although shown external to electrical system 101, control component 135 may be a part of electrical system 101.

Although monitor circuits 127 are shown as multiple separate circuits in FIG. 1, one of ordinary skill in the art will recognize that monitor circuits 127 may be implemented as a single circuit.

Figure 2:
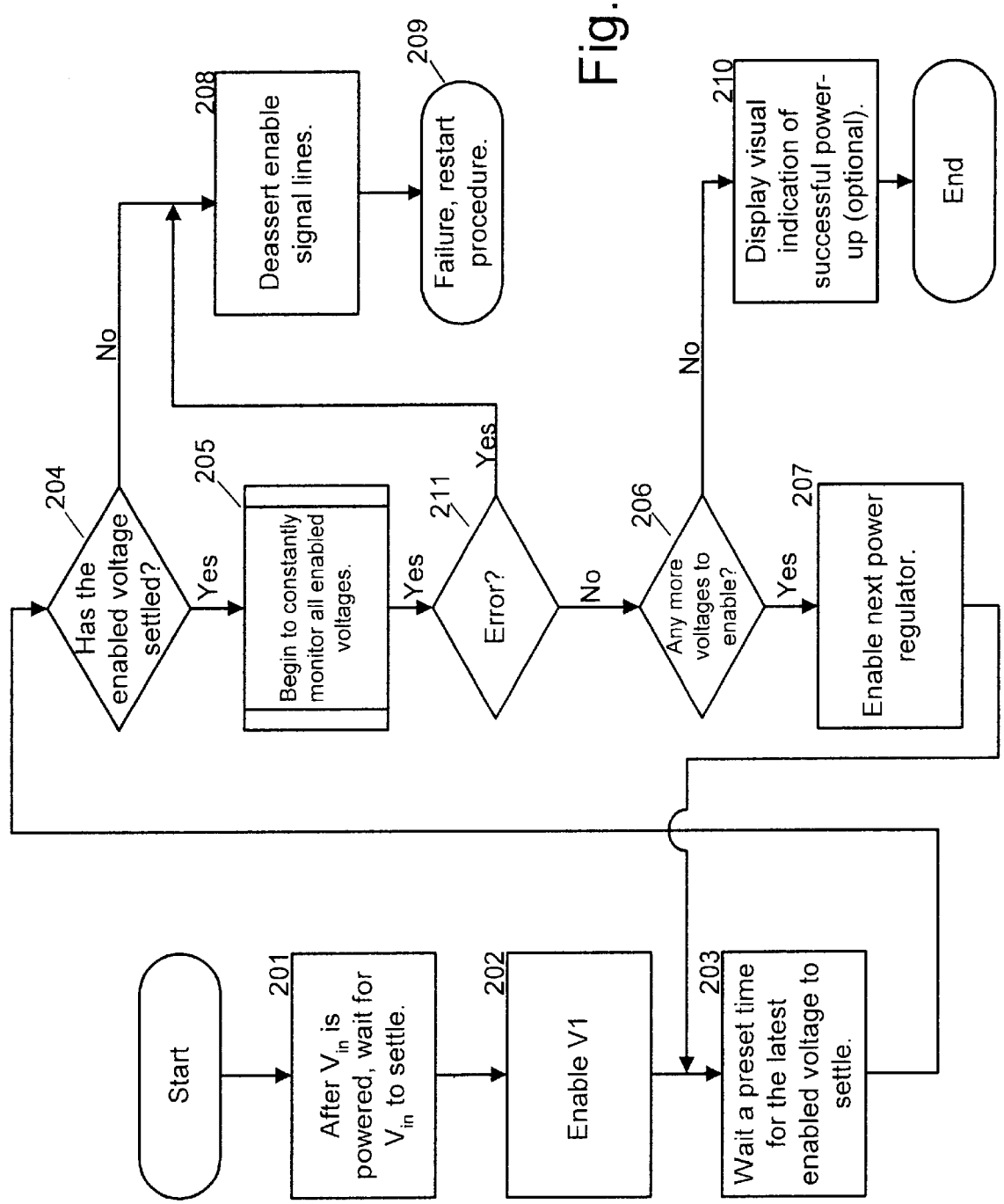
FIG. 2 is a flow chart illustrating methods consistent with the present invention for powering-up an electrical system.

FIG. 2 is a flow chart illustrating methods performed by voltage sequencer 103 in powering-up electrical system 101.

To begin a power-up sequence, decision logic 129 holds each of the enable signals 126 in their disabled state. Accordingly, at this point, no power is transmitted to electrical system 101 from voltage sequencer 103. After $V_{in}$ is applied for the main power source 130, decision logic 129 waits a preset time period (e.g., one second) for $V_{in}$ to settle. (Act 201).

When $V_{in}$ has settled, decision logic 129 activates the enable signal line 126 corresponding to the first power regulator 120. (Act 202). In response, the power regulator begins to apply power to the circuits in electrical system 101 that are connected to the power regulator (i.e., circuit 110). Decision logic 129 waits a preset time period for the newly supplied power to settle and for the supplied circuit 110 to stabilize. (Act 203). This time period may be individually set for each power regulator by storing the time period for each power regulator in a memory in control sequencing component 123. In this manner, the designer can easily adjust settle times based on requirements of the particular power regulator and the circuits in the electrical system 101.

After the preset wait time, if the monitor circuit 127 corresponding to the enabled power regulator 120 indicates that the newly supplied power has settled, decision logic 129 enables the next power regulator in the sequence (e.g., power regulator 121). (Acts 204, 206, and 207). Additionally, the monitor circuit begins to constantly monitor the power regulator that was turned on. (Acts 205 and 211). If any of the monitor circuits 127 for the turned on power regulators detect an error, or if the power from a regulator has not settled after the designated time, control sequence component 123 initiates a failure operation by disabling the power regulators 120–122 via de-assertion of the enable signal lines 126. (Acts 204, 205, 208, and 211). Control sequence component 123 may then reinitiate a power-up sequence, beginning at Act 202. (Act 209).

When all the circuits in the electrical system 101 have been successfully powered-up, voltage sequencer 103 may display a visual indication of the successful power up, such as by activating a light emitting diode. (Act 210)

To increase the linearity of the power-up sequence and to decrease power fluctuations, $V_1$, through $V_n$ in voltage sequencer 103 may be arranged so that either the powered-up voltages sequentially increase (as illustrated) or sequentially decrease.

Figure 3:
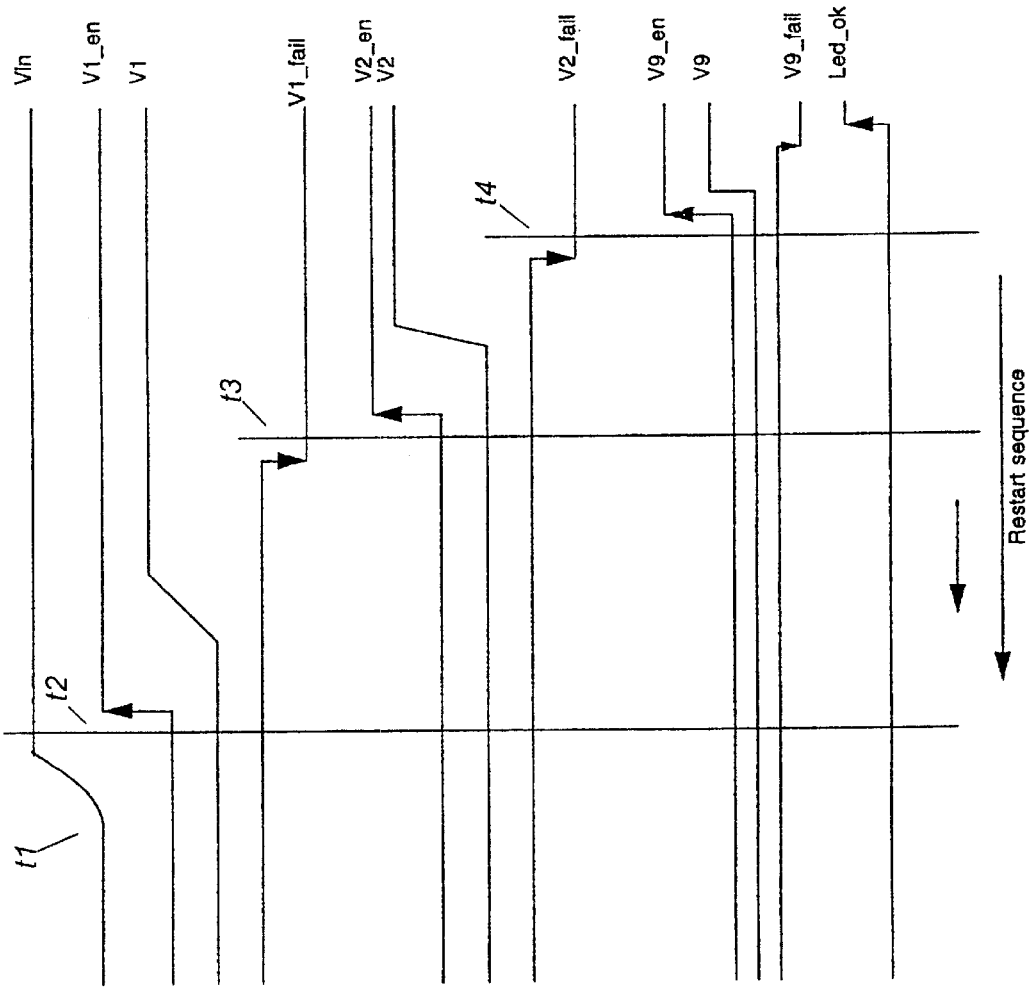
FIG. 3 is a timing diagram illustrating the interaction of various signal lines shown in FIG. 1.

FIG. 3 is a timing diagram illustrating the interaction of various signals shown in FIG. 1.

As illustrated, $V_{in}$ is activated at time t1. After a preset time period, decision logic 129 activates the enable signal line corresponding to voltage V1 (labeled as V1_en at time t2), which causes the power regulator 120 to begin to source voltage V1. As shown in FIG. 3, voltage V1, when turned on, may be increased gradually in a ramp fashion to decrease the chance that circuit 110 will be adversely affected by the power surge. At time t3, decision logic 129 checks the result of the monitor circuit 127 (labeled as V1_fail). As shown, V1_fail is at a low logic level, indicating that V1 is stable.

Voltage sequencer 103 repeats a similar sequence for voltage V2. More specifically, at time t3, V2_en is asserted, which turns on voltage V2. At time t4, decision logic 129 checks the result of the monitor circuit 127 (labeled as V2_fail). Because V2_fail indicates that V2 is also stable, the process continues. When voltage sequencer 103 successfully gets to the last power regulator (labeled as voltage V9), it may activate the LED 140 by activating the "Led_ok" signal line, which produces a visual indication that electrical system 101 has successfully powered-up.

If the power-up sequence repeatedly fails, voltage sequencer 103 may, after a number of attempts, completely abort the power-up sequence. In this situation, voltage sequencer 103 may identify the failing power regulators to a user for problem-solving purposes.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

Although described as being primarily implemented in hardware, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system.

The scope of the invention is defined by the claims and their equivalents.

What is claimed is:

1. A voltage sequencing device comprising:
   a plurality of electrical power sources, each configured to supply electrical power at an output;
   a control circuit configured to generate an enable signal for each of the plurality of electrical power sources in a predetermined sequence and with a respective delay between consecutive enable signals; and a plurality of monitors corresponding to respective ones of the plurality of electrical power sources, each monitor configured to provide a monitor signal indicative of the electrical power supplied at the output of the corresponding electrical power source, wherein the control circuit includes decision logic for determining that the electrical power supplied at the output of an electrical power source for which an enable signal was generated is stable based on the monitor signal corresponding to the electrical power source, and wherein the control circuit generates an enable signal for a next one of the plurality of electrical power sources in response to the determination.

2. The voltage sequencing device of claim 1, wherein the control circuit generates a disable signal for each electrical power source for which an enable signal was generated in response to a determination that the output of an electrical power source for which an enable signal was generated was not stable after the delay period.

3. The voltage sequencing device of claim 2, wherein the control circuit re-initiates the generation of enable signals in a predetermined sequence and with a respective delay between consecutive enable signals a predetermined amount of time after the generation of the disable signals.

4. A voltage sequencing device comprising:

a plurality of electrical power sources, each configured to supply electrical power at an output; and a control circuit configured to generate an enable signal for each of the plurality of electrical power sources in a predetermined sequence and with a respective delay between consecutive enable signals, wherein each of the plurality of electrical power sources supplies a different amount of voltage, and wherein the control circuit generates an enable signal for each of the plurality of electrical power sources in increasing order of power source voltage.

5. The voltage sequencing device of claim 4, wherein the respective delay between consecutive enable signals is adjustable.

6. A controller for enabling power to a system, comprising:

a first circuit for providing a first enable signal to a first power supply;

a second circuit for providing a second enable signal to a second power supply a predetermined amount of time after the first circuit provides the first enable signal; and a first power monitor for providing a monitor signal indicative of electrical power supplied at an output of the first power supply, wherein the second circuit provides the second enable signal after the predetermined amount of time and based on the monitor signal.

7. The controller of claim 6, wherein the second circuit provides the second enable signal when the monitor signal indicates the electric power at the output of the first power supply is stable.

8. The controller of claim 6, wherein the second circuit initiates disabling the first and second power supplies when the monitor signal indicates a failure in the electric power at the output of the first power supply.

9. The controller of claim 6, wherein the electrical power supplied by the first power supply is a first voltage that is less than a second voltage supplied by the second power supply.

10. The controller of claim 6, wherein the predetermined amount of time between the first and second enable signals is adjustable.

11. A device comprising:

an electrical system that includes a plurality of circuits designed to be powered from different electrical power sources that supply respective different electrical power levels; and a voltage sequencer coupled to the electrical system and supplying power to the plurality of circuits in the electrical system, the voltage sequencer including:

means for supplying electric power to the plurality of circuits, means for enabling the supplied electric power to the plurality of circuits in a predetermined sequence and with a respective delay period between supplying the electric power to each of the plurality of circuits.

12. The device of claim 11, wherein the device is a network router.

13. The device of claim 11, wherein the means for enabling further includes: means for monitoring the electric power supplied by the means for supplying.

14. The device of claim 13, wherein the means for enabling includes: means for disabling the electric power to the plurality of circuits when the means for monitoring the electric power determines a power failure in the electric power supplied to one of the plurality of circuits.

15. The device of claim 13, wherein the means for enabling supplies the electric power to the plurality of circuits when the means for monitoring the electric power determines the electric power is stable.

* * * * *